United States Patent
Nyhus et al.

(10) Patent No.: US 6,875,799 B2
(45) Date of Patent: Apr. 5, 2005

(54) PROCESS FOR THE PRODUCTION OF PARTICULAR POLYMERS

(75) Inventors: Anne Kari Nyhus, Hagan (NO); Anne-Marie Johansen, Lillestrom (NO); Svein Tøgersen, Oslo (NO)

(73) Assignee: Microbeads AS, Skedsmokorset (NO)

( * ) Notice: Subject to any disclaimer, the term of this patent is extended or adjusted under 35 U.S.C. 154(b) by 0 days.

(21) Appl. No.: 10/398,214

(22) PCT Filed: Oct. 9, 2001

(86) PCT No.: PCT/GB01/04507

§ 371 (c)(1),
(2), (4) Date: Jul. 21, 2003

(87) PCT Pub. No.: WO02/31009

PCT Pub. Date: Apr. 18, 2002

(65) Prior Publication Data

US 2004/0097656 A1 May 20, 2004

(30) Foreign Application Priority Data

Oct. 9, 2000 (GB) ............................................ 00246884

(51) Int. Cl.[7] ..................... C08F 257/02; C08F 265/00; C08F 291/00; C08L 25/00; C08L 51/00
(52) U.S. Cl. ...................... 523/200; 523/202; 523/205; 523/207; 524/458; 526/201
(58) Field of Search ......................... 526/201; 524/458; 523/202, 205, 207, 210, 211

(56) References Cited

U.S. PATENT DOCUMENTS 4,336,173 A * 6/1982 Ugelstad ...................... 523/205
4,714,682 A * 12/1987 Schwartz ...................... 436/10
5,972,363 A * 10/1999 Clikeman et al. ........... 424/408

FOREIGN PATENT DOCUMENTS

| JP | 61215605 | * 9/1986 | ............. C08F/2/00 |
| WO | 83/01453 A1 | 4/1983 | |

* cited by examiner

Primary Examiner—Kelechi C. Egwim
(74) Attorney, Agent, or Firm—Bacon & Thomas PLLC

(57) ABSTRACT

The invention describes a process for the preparation of a particulate polymer, said process comprising: i) forming an aqueous dispersion comprising a particulate polymer seed material and a first organic compound; ii) allowing said first organic compound to diffuse into said seed material to produce a pre-swollen seed material; iii) contacting said pre-swollen seed material in aqueous dispersion with said first organic compound and a second organic compound, preferably one which is soluble in said first organic compound; iv) allowing or causing said first and second organic compounds to pass into said pre-swollen seed material to produce an activated seed material; v) contacting said activated seed material with a monomer and effecting suspension polymerization thereof.

10 Claims, No Drawings

PROCESS FOR THE PRODUCTION OF PARTICULAR POLYMERS

This invention relates to improvements in and relating to the production of particulate polymers, especially vinyl aliphatic (e.g. acrylic) and vinyl aromatic (e.g. styrenic) polymers, such as for example polymethylmethacrylates and polystyrenes.

In WO99/19375 (Dyno), there is described a process for the production of particulate polymers, e.g. expandable polystyrene (EPS) beads, in which an initial, essentially monodisperse seed material having a particle size of about 10–20 μm (produced for example using the Ugelstad technique described in EP-B-3905, U.S. Pat. No. 4,336,173 and U.S. Pat. No. 4,459,378 and in WO00/61647 (Dyno Specialty Polymers AS) is expanded in a series of polymerization stages to produce essentially monodisperse polymer particles of a desired final particle size of for example 200 to 2000 μm.

At least one of the expansion stages used in WO99/19375 is a suspension polymerization. In WO00/61648 (Dyno Specialty Polymers AS), a development of the process of WO99/19375 was described in which at least one of the expansion stages used is an Ugelstad process which involves swelling the seed polymer for that expansion stage with an organic material having a molecular weight of less than 5000 g/mol and a water solubility at 25° C. of less than $10^{-2}$ g/L, then contacting the swollen seed with monomer and initiating polymerization. In conventional seeded suspension polymerization processes the maximum volume increase in one polymerization stage is normally about ×5 or less. Using the Ugelstad technique a volume increase of ×125 or more can be achieved.

As used herein Dynoseeds processes refer to those processes disclosed in WO99/19375 and WO00/61648; and Ugelstad processes refer to those disclosed in EP-B-3905, U.S. Pat. No. 4,336,173, U.S. Pat. No. 4,459,378 and WO00/61647.

We have now found that the swelling step of an Ugelstad or other seeded suspension polymerization stage, if used to introduce additives into the seeds, is much more efficient if performed as at least two steps.

Viewed from one aspect therefore the invention provides a process for the preparation of a particulate polymer, said process comprising:

i) forming an aqueous dispersion comprising a particulate polymer seed material and a first organic compound;

ii) allowing said first organic compound to diffuse into said seed material to produce a pre-swollen is seed material;

iii) contacting said pre-swollen seed material in aqueous dispersion with said first organic compound and a second organic compound, preferably one which is soluble in said first organic compound;

iv) allowing or causing said first and second organic compounds to pass into, e.g. diffuse into, said pre-swollen seed material to produce an activated seed material;

v) contacting said activated seed material with a monomer and effecting suspension polymerization thereof.

Preferably, the first organic compound has a molecular weight of less than 5000 g/mol and a water solubility of lest than 50 g/L, e.g. less than 25 g/L at 25° C. Where the swelling stage is an Ugelstad stage, the water solubility is preferably less than 1 g/L, e.g. less than 0.5 g/L or less than $10^{-2}$ g/L at 25° C.

In step (i) of the process of the intention, the second organic compound may also be added; however if this is done the molar ratio of second to first compound added in step (i) must be lower than the molar ratio of second to first compound added in step (iii). Likewise steps (iii) and (iv) may be repeated one or more further times to produce the activated seed material used in step (v), optionally using a different second organic compound (or compounds) or second organic compounds in different relative mole ratios in such repeats.

In step iv), the first and second organic compounds are preferably allowed to disperse into the pre-swollen seed particles, i.e. particles which have been "softened" in the pre-swelling stages i) and ii). However, if desired step iv) may involve a mechanical mixing so as to cause uptake of the second organic compound by the seeds.

In step iii), the second organic compound may be contacted with the pre-swollen seed particles simultaneously with the first organic compound. However in one preferred embodiment the pre-swollen particles are first contacted with the first organic compound and then after a time delay, e.g. of 10 to 100 minutes, preferably 30 to 90 minutes, the second organic compound is added.

The quantities of first organic compound used in steps i) and iii) respectively are preferably in a weight ratio of 1:10 to 10:1, more preferably 1:3 to 3:1, still more preferably 1:1.5 to 1.5:1, e.g. 1:1. The total amount of first organic compound used in the swelling is preferably 10 to 80% wt of the weight of the seed particles, more preferably 30 to 70% wt, especially 40 to 60% wt.

If desired, the swelling stages in the process of the invention may be effected with a single contacting step during which the first organic compound is added continuously and the second organic compound is added continuously or intermittently with the ratio of second to first compound in the material being added increasing in a gradual or stepwise fashion.

Thus viewed from a further aspect the invention provides a process for the preparation of a particulate polymer, said process comprising:

1) forming an aqueous dispersion comprising a particulate polymer seed material and a first organic compound;

2) continuously adding to said dispersion said first organic compound and continuously or intermittently adding to said dispersion a second organic compound, preferably one which is soluble in said first organic compound, the molar ratio of said second organic compound to said first organic compound rising during the course of their addition;

3) allowing or causing said first and second organic compounds to pass into, e.g. to diffuse into, said seed material to produce an activated seed material;

4) contacting said activated seed material with a monomer and effecting suspension polymerization thereof.

Preferably, the first organic compound has a molecular weight of less than 5000 g/mol and a water solubility of less than 50 g/L, e.g. less than 25 g/L at 25° C. Where the swelling stage is an Ugelstad stage, the water solubility is preferably less than 1 g/L, e.g. less than 0.5 g/L or less than $10^{-2}$ g/L at 25° C.

In the processes of the invention, the temperature of the dispersion preferably increases as the swelling progresses, e.g. within the range 10 to 120° C. Particularly preferably the pre-swell (i.e. steps i) and ii)) is effected between 10 and 65° C., such as between 20 and 60° C. especially between 20 and 55° C., more especially between 25 and 50° C., particularly between 30 and 45° C. The subsequent swell (i.e. steps iii) and iv)) is preferably effected between 40 and 120° C., especially between 60 and 90° C., particularly between 70 and 90° C. Thus the dispersion is preferably heated between steps ii) and iii). In the case of a continuous swell (i.e. steps 1), 2) and 3)), the temperature of the dispersion is preferably similarly raised from an initial value in the range 10 to 65° C. to a final value in the range 40 to 120° C., e.g. from a temperature in the range 30 to 45° C. to a temperature in the range 70 to 90° C.

The swelling stages preferably are effected over a total period of ½ to 12 hours, more preferably 1 to 10 hours, especially 1½ to 8 hours.

The first organic compound may be any material which is capable of swelling the seeds and preferably also of dissolving the second organic compound. It may, for example comprise one or more monomers, one or more organic solvents such as toluene or xylene, one or more organic lubricants such as fatty acid esters (e.g. glycerol monostearate) or alkanes, or one or more plasticisers such as dibutyl phthalate or triphenyl phosphate. However, it may not be a polymerization initiator (e.g. dibenzoyl peroxide). Particularly preferably it is a monomer for the polymerization step (i.e. v) or 4)), e.g. a vinyl aliphatic compound, for example acrylic acid, methacrylic acid, methylacrylate, methyl methacrylate, etc, or more preferably a vinyl aromatic compound, e.g. styrene or a styrene derivative, for example an alkyl styrene (e.g. a $C_{1-3}$ alkyl styrene such as o-methyl styrene, m-methyl-styrene, p-methylstyrene, dimethyistyrene, ethylstyrene, ethyl-methyl-styrene, etc.), a halo styrene (e.g. p-chlorostyrene, 2,4-dichlorostyrene, etc), an aminostyrene (e.g. 4-amino-styrene), or other conventional or non-conventional styrenes. The first organic compound may if desired comprise two or more monomers, e.g. styrene and a styrene derivative. The first organic compound however preferably is a single monomer, especially preferably an acrylate, particularly preferably styrene.

The second organic compound is desirably an additive the presence of which in the final polymer particles is desired, i.e. it is preferably a compound which does not participate in the polymerization reaction as a monomer, catalyst or initiator. It may however be a compound which becomes covalently bound to the polymer matrix. It may also be a crosslinking agent. It is therefore preferred that when the process of the invention forms part of a multi-stage seeded suspension polymerization reaction it should be the final or less preferably the penultimate stage. In general however the second organic compound will preferably be added in such a way that it is substantially uniformly distributed in the final polymer particles. This is especially true where the additive is a nucleating agent and the final particles are EPS particles.

The second organic compound is preferably water-insoluble or poorly water-soluble, e.g. having a solubility of less than $10^{-2}$ g/L at 25° C. However water is soluble compounds, e.g. amphiphilic compounds particularly dyes and surfactants, may be used as the second organic compound.

Typical types of material which may be used as the second organic compound include colouring agents (e.g. dyes and pigments), antioxidants, organic solvents, lubricants (e.g. slip agents), anti-fog agents, antistatic agents, anti-slip agents, tracers (e.g. radiolabels), stabilizers (e.g. radiation stabilizers), waxes, polymers, dyes and surfactants, volatile compounds, nucleating agents etc.

While inorganic pigments, e.g. 3–20 $\mu$m sized particles may be used, for example at 2 to 3% wt of overall polymer particle, it is much more preferred to use organic dyes as colouring agents, especially ones soluble in the pre-swollen seed particles. Dyes will generally be used at less than 1% wt, preferably less than 0.5% wt, e.g. 0.1 to 0.2% wt, of the polymer particles. Polar dyes are preferred as these will generally not migrate into any polyolefin matrix in which the dye-loaded polymer particles are dispersed.

The second organic compound is preferably added to the seed dispersion as a solution in the first organic compound, optionally presented as an oil-in-water emulsion.

Step v) or 4) will involve contacting the seed with monomer and a polymerization initiator and effecting polymerization of the monomer. The initiator will preferably be one which serves to initiate polymerization when a threshold value of a physical property is reached, e.g. when the reaction mixture is heated (thermal initiator) or exposed to radiation (light initiator). Thermal initiators, e.g. dibenzoylperoxide, are especially preferred. Where thermal initiators are used, if these are present in the swelling stage it is preferred that the initiation temperature should not be exceeded during swelling.

Where the process of the invention is the final stage of a multistage polymerization, it may be preferred to include a cross-linking agent with the monomer so that cross-linked polymer particles are produced. The cross-linking agent may be any such agent capable of cross-linking polymers of the selected monomer. Thus for styrene polymers the use of divinylbenzene as a cross-linking agent is preferred.

Where the process of the invention is the final stage of a multistage polymerization, it may be preferred to include a porogen or blowing agent with the monomer so that porous polymer particles or expandable polymer particles are produced. Standard porogens and blowing agents may be used in this regard.

The swelling stage or stages may be further facilitated by addition to the dispersion of an organic solvent, e.g. an aromatic or aliphatic solvent such as a ketone (e.g. acetone), ether, ester, acid or alkanol (e.g. ethanol). Typically such a solvent may be added in quantities of up to 80% wt., more preferably 10 to 60% wt., of the first or first and second compound. Solvent addition is especially preferred in step iii).

The seeds used in the process of the invention may be of any polymer or oligomer into which the monomer used in the process may diffuses. They are preferably substantially monodisperse particles, e.g. with a coefficient of variation (CV) (measured for at least 100, more preferably at least 1000, particles) of less than 20%, preferably less than 15%, more preferably less than 12%, still more preferably less than 10%, particularly preferably less than 8%. CV is determined as a percentage as $$CV = 100 \times \text{standard deviation/mean}$$

where mean in the mean particle diameter and standard deviation is the standard deviation in particle diameter CV is preferably calculated on the main node, i.e. by fitting a monomodal distribution curve to the detected particle size distribution. Such a determination of CV is performable on a Coulter LS 130 particle size analyser.

The seed particles may be produced by emulsion or suspension polymerization, optionally followed by a screening to remove over or undersized particles.

Particularly preferably the seed particles are produced using an Ugelstad process such as those described in EP-B-3905, U.S. Pat. No. 4,336,173 and U.S. Pat. No. 4,459,378 or by a multistage expansion, e.g. according to WO99/19375 or WO00/61648, or by a process according to the invention itself starting directly or indirectly with such particles.

Substantially monodisperse polymer particles produced by an Ugelstad process are sold commercially by Polymer Systems AS under the trade name Dynospheres, typically with mode particle sizes in the range of 0.5 to 50 $\mu$m especially 5 to 30 $\mu$m, e.g. 10–20 $\mu$m.

Depending upon the desired uses to which the particles produced by the processes of the invention are to be put, the process according to the invention may use seed particles with a mode particle diameter of at least 50 μm, more preferably at least 100 μm, especially at least 200 μm, e.g. up to 1000 μm. Alternatively, substantially smaller seed particles may be employed, such as those described infra produced accordingly to Ugelstad processes or by emulsion/suspension polymerisation processes followed by screening.

The seed particles used in the process of the invention are preferably not cross-linked, and indeed the polymer is preferably of relatively low molecular weight, e.g. Mw of 8 to 200 kg/mol, especially 10 to 100 kg/mol.

Appropriately sized seed particles for the process of the invention are commercially available from Polymer Systems AS of Lillestrom, Norway under the trademark Dynoseeds.

Multistage particle expansion processes, e.g. using the Ugelstad or Dynoseeds processes referred to above but including a process of the invention as at least one expansion stage, preferably the final stage or less preferably the penultimate expansion stage, form further aspects of the invention.

The molecular weight of the final polymer particles may desirably be selected so as to achieve the desired degree of solubility of the second organic compound in the polymer of the particles, or to achieve a desired solubility difference or solubility ratio for the solubility of the second organic compound in the polymer particles and in the surrounding matrix or support medium in which the particles are dispersed in their end use.

The process of the invention is preferably performed with a stabilizer present in the dispersion. Stabilizer systems such as are described in WO00/61647 are preferred, especially polyvinylpyrrolidone (PVP) and tricalcium phosphate/surfactant systems and cellulose ether systems.

The PVP preferably has a weight average molecular weight of 10 to 2000 kg/mol, more preferably 25 to 1500 kg/mol, especially 30 to 1000 kg/mol. Where the swollen particles have sizes at the lower end of the 1 to 25 μm range it is preferred to use lower molecular weight PVP and where the swollen particles have sizes at the upper end of that range it is preferred to use higher molecular weight PVP. Thus for example 20 to 80 kg/mol, e.g. 30 kg/mol PVP is particularly suitable for swollen particle sizes of up to 8 μm while 900 to 1500 kg/mol PVP is particularly suitable for swollen particle sizes above 8 μm. Examples of suitable such PVP include PVP K30 and PVP K90 (available for example from International Speciality Products and from Fluka).

Examples of suitable cellulose ethers include alkyl celluloses, preferably $C_{1-4}$-alkyl celluloses; and (hydroxyalkyl)alkyl celluloses, preferably (hydroxy-$C_{1-4}$-alkyl)$C_{1-4}$-alkyl celluloses, more preferably (hydroxy-$C_{1-4}$-alkyl)methyl celluloses. Typically, these cellulose ethers have weight average molecular weights in the range 10 to 100 kg/mol, especially 15 to 80 kg/mol. Such materials are available commercially in a range of different degrees of substitution and molecular weight, e.g. as Benecel MP 333C, Benecel MP 651C, Culminal MHPC 1500, Culminal MHPC 400, Walocel MK 400 PFV and Methocel K100. Cellulose ethers which generate a viscosity when in 2% aqueous solution at 21° C. of 50 to 150 mPa.s are especially preferred.

The second organic compound used in the process of the invention is preferably an additive the presence of which is desired in a material in which the polymer particles produced by the process of the invention are added as a component, e.g. paints, polymer articles (e.g. sheets, films, rods, moulded items, etc.), and the like. Examples of such matrix polymers include polycarbonates, polystyrenes, HIPS, ABS, etc. Materials for forming, e.g. powders, pellets, etc., can be produced for example by coextruding the matrix polymer and the polymer particles containing the second organic compound. It is thus possible through the processes of the invention to incorporate, as the second organic compound, materials which are difficult, and/or hazardous to work with into polymeric particles before the incorporation into the final desired products. Such awkward to handle components may be liquids, fine powders or solids and as such present handling problems. In this way if the additive is soluble in the matrix surrounding the particles, the particles can act as a dispersion agent for colours and additives or as a processing aid or as a reservoir for prolonged release of the additive into the matrix.

Thus a further particular use is to use the particles as reservoirs for agents which will be released into the matrix material, e.g. slip agents, anti-fog agents, anti-static agents, aromas, cross-linking agents, UV stabilizers, antioxidants, and antibiotics (e.g. antifungals, antibacterials, etc.). The particles may therefore be used to provide a slow release system for such additives. This may be used to ensure that the additive's effect is maintained for a longer period than would be the case were the additive only to be dispersed directly in the surrounding matrix, e.g. polymer product such as a film, sheet, etc. Such additive-loaded particles and materials and articles containing them form further aspects of the invention. The incorporation of such additives in polymer particles, e.g. produced by the Ugelstad and Dynoseeds processes referred to above, is also novel and forms a further aspect of the invention as do the resulting particles and materials and articles containing them.

A further use of such loaded particles is as a reservoir for drugs in pharmaceutical compositions, especially topically applied compositions such as gels, creams, ointments, salves and more especially plasters and patches. In such embodiments, the drug should be soluble in the surrounding carrier medium, e.g. the gel matrix or plaster adhesive.

Viewed from a further aspect therefore the invention provides compositions and articles comprising a matrix material containing polymer particles impregnated with an additive which is soluble in said matrix material, particularly polymer particles produced by a process according to the present invention according to an Ugelstad or Dynoseeds process (supra).

If the additive is insoluble or poorly soluble in the matrix or is covalently bound within the particles the particles can act to retain the additive. One particular use in this regard is use of the particles to retain a dye for inclusion in polymer articles, especially polymer (particularly polyolefin, e.g. polyethylene or polypropylene) sheet, e.g. polymer bags. In this way a polymer article may be coloured by inclusion of the dye-containing particles in the matrix polymer or a design may be applied by selective inclusion of dye-containing particles in regions of the article. This may be used for example to avoid dye release from articles such as shopping bags. Articles may similarly be marked by use of particles containing a detectable tracer, e.g. a chromophore, fluorophore, radiolabel or genetic material (e.g. oligonucleotide) marker. This phenomenon is of wide applicability. Thus where an additive in question may have poor compatibility with the matrix polymer, this incompatibility causes the additive to leach from the matrix polymer over time. In this way the additive and its effect are lost. If the additive is a dye or a pigment, colouring will diminish; if the additive is a stabilizer, the polymeric article may become statically charged and/or susceptible to degradation by UV light. In contrast, particles produced according to this invention may, by virtue of their insolubility in the polymer matrix, remain within the particles within the matrix phase. During processing, for example during extrusion, the matrix and the particles of the invention may melt whereby to form nanoparticles or domains which contain the desired additive. The mode of containment may be by way of dispersion or by dissolution. Alternatively the additive may be physically or covalently bound to the surface of the domain.

Viewed from a still further aspect the invention provides compositions and articles comprising a matrix material, e.g. an olefin material, especially polyethylene or polypropylene, containing polymer particles impregnated with an additive which is insoluble in said matrix material or is bound, e.g. adsorbed or more preferably covalently bound, to the polymer of said polymer particles, particularly polymer particles produced by a process according to the present invention or according to an Ugelstad or Dynoseeds process (supra).

The paint base for such acrylic paints may be a conventional acrylic paint. The acrylic particles are preferably acrylates, methacrylates, methyl acrylates or most preferably methylmethacrylates. The inclusion of the particles causes the paints to become particularly tough and matte. The polymer particles are preferably present as from 2 to 15% wt, more preferably 5 to 10% wt of such paints. Preferably, particles to size 80–1000 $\mu$m are used in paints such as acrylic paints.

Particles to size 5–30 $\mu$m may be used as matting agents in coatings; and 200–500 $\mu$m may be used as light scattering agents in road paints. In such applications the base resin may be any convenient medium, for example acrylates, methacrylates, methyl acrylates or moot preferably methylmethacrylates; or solvent and water-based coatings. In such applications the second organic compound is preferably a crosslinking agent, e.g. divinyl benzene.

The polymer particles produced by the process of the invention, or by a Dynoseeds or Ugelstad process (supra), preferably those having a size of 5–30 $\mu$m, may advantageously be used in 3D-printing, a technique for producing 3D objects from a powder starting material and described in *New Scientist*, 30, Sep. 2000, pages 25 to 27. Particles used in such applications produced by the processes of the invention will have as said second organic component a dye. Thus viewed from a further aspect the invention provides a process for 3D-printing using a powder starting material, characterized in that as said material is used polymer particles produced by the process of the invention, or by a Dynoseeds or Ugelstad process (supra). In such printing, particle to particle adhesion may be achieved using glues, laser-melting, etc.

The patents, patent applications and publications referred to herein are hereby incorporated by reference.

The invention will now be illustrated further by the following non-limiting Examples.

EXAMPLE 1

A reactor was charged with 200 g 228 $\mu$m dry particles Dynoseeds® TS 230-52, 1000 g water, 20 g tricalcium phosphate, 25 g 2-ethylhexanoic acid and 0.06 g sodium dodecylbenzenesulfonate. The suspension was stirred at 300 rpm and heated to 40° C. over ½ hour. 40 g styrene was added at 40° C. in a first pre-swell step. The suspension was kept at 40° C. for 1 hour, then raised to 80° C. over ½ hour. When 80° C. was reached 10 g erucamide dissolved in 40 g styrene was added followed by an addition of 25 g ethanol. The suspension was stirred at 300 rpm and kept at 80° C. for 1 hour. 8 g dibenzoyl peroxide (BPO) (75% in water) was dissolved in 720 g styrene in a 2 L vessel using a magnetic stirrer. The mixture was continuously added to the reactor in bulk over 4 hours at a rate of 181.9 g/h. After the addition of styrene/BPO mixture was completed the temperature was raised to 90° C. and the reaction mixture was maintained at 90° C. for 1 hour to deplete monomer.

Final particle size was: 390 $\mu$m.

EXAMPLE 2

A reactor was charged with 200 g 228 $\mu$m dry particles Dynoseeds® TS 230-52, 1000 g water, 20 g tricalcium phosphate and 0.06 g sodium dodecylbenzenesulfonate. The suspension was stirred at 300 rpm and heated to 40° C. over ½ hour. 40 g styrene was added at 40° C. in a first pre-swell step. The suspension was kept at 40° C. for 1 hour, then raised to 80° C. over ½ hour. When BOC was reached, 5 g polyethylene wax (Polywax 1000) dissolved in 40 g styrene was added. The suspension was stirred at 300 rpm and kept at 80° C. for 1 hour. 8 g dibenzoyl peroxide (BPO) (75% in water) was dissolved in 720 g styrene in a 2 L vessel using a magnetic stirrer. The mixture was continuously added to the reactor in bulk over 4 hours at a rate of 181.9 g/h. After the addition of styrene/BPO mixture was completed the temperature was raised to 90° C. and the reaction mixture was maintained at 90° C. for 1 hour to deplete monomer.

Final particle size was: 390 $\mu$m.

EXAMPLE 3

A reactor was charged with 100 g 140 $\mu$m dry PS particles Dynoseeds® TS 140-51, 1500 g water, 7.5 g tricalcium phosphate and 0.05 g dodecylbenzenesulfonate. The suspension was stirred at 150 rpm and heated to 40° C. over ½ hour. At 40° C. the stirring speed was increased to 200 rpm and 12 g of triphenylphosphate dissolved in 15 g styrene was added over 30 minutes at 40° C. in a first pre-swell step. The suspension was kept at 40° C. for 1 hour and then raised to 90° C. over ½ hour. When 90° C. was reached 5 g of 9,10 diphenylanthracene dissolved in 15 g styrene was added over 30 minutes. The suspension was stirred at 200 rpm and kept at 90° C. in this second pre-swell step. 4.0 g dibenzoyl peroxide (BPO) and 13 g triphenylphosphate were dissolved in 370 g styrene in a 1 L vessel using a magnetic stirrer. After the second pre-swell step was completed the mixture was continuously charged to the reactor in bulk over 4 hours at a rate of 121.8 g/h. After the addition of styrene/BPO/triphenylphosphate was completed the temperature was raised to 90° C. and the reaction mixture was maintained at 90° C. for 1 hour at 90° C. to deplete monomer.

Final particle size was: 240 $\mu$m.

EXAMPLE 4

A reactor was charged with 100 g 140 $\mu$m dry PS particles Dynoseeds® TS 140-51, 1500 g water, 7.5 g tricalcium phosphate and 0.05 g dodecylbenzenesulfonate. The suspension was stirred at 150 rpm and heated to 40° C. over ½ hour. At 40° C. the stirring speed was increased to 200 rpm and 12 g of triphenylphosphate dissolved in 15 g styrene was added over 30 minutes at 40° C. in a first pre-swell step. The suspension was kept at 40° C. for 1 hour and then raised to 90° C. over ½ hour. When 90° C. was reached 5 g of glycerol monostearate dissolved in 15 g styrene was added over 30 minutes. The suspension was stirred at 200 rpm and kept at 90° C. in this second pre-swell step. 4.0 g dibenzoyl peroxide (BPO) and 13 g triphenylphosphate were dissolved in 370 g styrene in a 1 L vessel using a magnetic stirrer. After the second pre-swell step was completed the mixture was continuously charged to the reactor in bulk over 4 hours at a rate of 121.8 g/h. After the addition of styrene/BPO/triphenylphosphate was completed the temperature was raised to 90° C. and the reaction mixture was maintained at 90° C. for 1 hour at 90° C. to deplete monomer.

Final particle size was: 240 µm.

What is claimed is:

1. A process for the preparation of a particulate polymer, said process comprising:
   i) forming an aqueous dispersion comprising a particulate polymer seed material and a first organic compound, which is a monomer;
   ii) allowing said first organic compound to diffuse into said seed material to produce a pre-swollen seed material;
   iii) contacting said pre-swollen seed material in aqueous dispersion with said first organic compound and a second organic compound,
   iv) allowing or causing said first and second organic compounds to pass into said pre-swollen seed material to produce an activated seed material;
   v) contacting said activated seed material with a monomer and effecting suspension polymerization thereof.

2. A method as claimed in claim 1 wherein said first organic compound has a molecular weight of less than 5000 g/mol and a water solubility of less than 25 g/L at 25° C.

3. A method as claimed in claim 1 wherein said first organic compound has a molecular weight of less than 5000 g/mol and a water solubility of less than 1 g/L at 25° C.

4. A method as claimed in claim 1 wherein said particulate polymer seed material is produced according to a method as defined in claim 1 or is produced according to a Dynoseeds or Ugelstad process.

5. A method as claimed in claim 1 wherein said second organic compound is an additive which does not participate in the polymerization reaction as a monomer.

6. A method as claimed in claim 1 wherein said second organic compound is an additive which does not participate in the polymerization process as a monomer, catalyst or initiator.

7. A method as claimed in claim 1 wherein said first organic compound is styrene.

8. A method as claimed in claim 1 wherein said second organic compound is selected from the group consisting of coloring agents, antioxidants, organic solvents, lubricants, anti-fog agents, anti-static agents, anti-slip agents, tracers, stabilizers, waxes, polymers, dyes, surfactants, volatile compounds and nucleating agents.

9. A method as claimed in claim 1 wherein said second organic compound is a crosslinking agent, antibiotic or a drug.

10. A method as claimed in claim 1, wherein the second organic compound is soluble in said first organic compound.

* * * * *